(12) United States Patent
Yang et al.

(10) Patent No.: US 10,659,697 B2
(45) Date of Patent: May 19, 2020

(54) PORTABLE ELECTRONIC DEVICE WITH RETRACTABLE ANTENNA ROD FOR A CAMERA

(71) Applicants: Jinrong Yang, Shanghai (CN); Ramzi Khalil Maalouf, Chevy Chase, MD (US)

(72) Inventors: Jinrong Yang, Shanghai (CN); Ramzi Khalil Maalouf, Chevy Chase, MD (US)

(*) Notice: Subject to any disclaimer, the term of this patent is extended or adjusted under 35 U.S.C. 154(b) by 0 days.

(21) Appl. No.: 15/438,711

(22) Filed: Feb. 21, 2017

(65) Prior Publication Data

US 2017/0244903 A1 Aug. 24, 2017

Related U.S. Application Data

(60) Provisional application No. 62/297,920, filed on Feb. 21, 2016.

(51) Int. Cl.
*H04N 5/232* (2006.01)
*H04N 5/225* (2006.01)

(52) U.S. Cl.
CPC ....... *H04N 5/23296* (2013.01); *H04N 5/2252* (2013.01); *H04N 5/2257* (2013.01); *H04N 5/23203* (2013.01); *H04N 5/23216* (2013.01); *H04N 5/23293* (2013.01)

(58) Field of Classification Search
CPC .......... H04N 5/23296; H04N 5/2252; H04N 5/23293; H04N 5/23216; H04N 5/23203

USPC .......................................................... 348/373
See application file for complete search history.

(56) References Cited

U.S. PATENT DOCUMENTS

| | | | | |
|---|---|---|---|---|
| 5,815,759 A * | 9/1998 | Tseng | ........... | H04N 5/2259 348/374 |
| 6,751,473 B1 * | 6/2004 | Goyal | ........... | H04M 1/0247 348/E7.082 |
| 7,210,629 B2 * | 5/2007 | Cho | ........... | H04N 5/2254 235/454 |
| 9,031,610 B2 * | 5/2015 | Kulas | ........... | H04M 1/0254 455/556.1 |
| 9,888,183 B2 * | 2/2018 | Rousseau | ........... | H04N 5/23293 |
| 2002/0163578 A1 * | 11/2002 | Adair | ........... | A61B 1/00016 348/158 |
| 2004/0245342 A1 * | 12/2004 | Cho | ........... | H04N 5/2254 235/472.01 |
| 2013/0044257 A1 * | 2/2013 | Chien | ........... | H04M 1/0264 348/373 |
| 2013/0150122 A1 * | 6/2013 | Kulas | ........... | H04M 1/0264 455/556.1 |
| 2016/0337492 A1 * | 11/2016 | Tseng | ........... | H04M 1/0264 |
| 2017/0034319 A1 * | 2/2017 | Chenn | ........... | H04N 5/2257 |

(Continued)

*Primary Examiner* — Pritham D Prabhakher
(74) *Attorney, Agent, or Firm* — Dickinson Wright PLLC (57) ABSTRACT

A portable electronic device including a housing, a retractable antenna rod, and a camera. The housing includes an opening on a side of the housing and a longitudinal axis. The retractable antenna rod extends out from the opening and is coupled to the housing at a first end of the retractable antenna rod. The retractable antenna rod is movable along the longitudinal axis of the housing. The camera is coupled to a second end of the retractable antenna rod. The camera is positionable within the opening of the housing when the retractable antenna rod is retracted into the housing.

13 Claims, 6 Drawing Sheets

(56) References Cited

U.S. PATENT DOCUMENTS

2017/0123463 A1* 5/2017 Douglas ................ G06F 1/1686
2017/0244902 A1* 8/2017 DiMenichi ........... H04N 5/2251

* cited by examiner

PORTABLE ELECTRONIC DEVICE WITH RETRACTABLE ANTENNA ROD FOR A CAMERA

RELATED APPLICATIONS

This application claims priority to U.S. Provisional Application No. 62/297,920, entitled "TERMINAL EQUIPPED WITH A REMOVABLE ROBOTIC MODULE," filed Feb. 21, 2016, the entire contents of which is incorporated herein by reference.

BACKGROUND

Portable electronic devices (such as mobile phones) include cameras to capture pictures and video. The cameras in most portable electronic devices are fixed to the devices such that they are limited to capturing pictures and video in a single direction. Many portable electronic devices include a second camera positioned on an opposite side from the first camera in order to capture pictures and video in more than one direction.

SUMMARY

The disclosure provides a portable electronic device including a housing, a retractable antenna rod, and a camera. The housing includes an opening on a side of the housing and a longitudinal axis. The retractable antenna rod extends out from the opening and is coupled to the housing at a first end of the retractable antenna rod. The retractable antenna rod is movable along the longitudinal axis of the housing. The camera is coupled to a second end of the retractable antenna rod. The camera is positionable within the opening of the housing when the retractable antenna rod is retracted into the housing.

The disclosure also provides a portable electronic device including a housing, a retractable antenna rod, and a camera. The housing includes an opening on a side of the housing. The retractable antenna rod extends out from the opening and is coupled to the housing at a first end of the retractable antenna rod. The retractable antenna rod is movable between a retracted position and an extended position. The camera is coupled to a second end of the retractable antenna rod. The camera is positioned outside of the housing when the retractable antenna rod is in the extended position. The camera is positioned within the housing when the retractable antenna rod is in the retracted position.

Other aspects of the disclosure will become apparent by consideration of the detailed description and accompanying drawings.

DETAILED DESCRIPTION

For ease of description, each of the exemplary systems presented herein is illustrated with a single exemplar of each of its component parts. Some examples may not describe or illustrate all components of the systems. Other exemplary embodiments may include more or fewer of each of the illustrated components, may combine some components, or may include additional or alternative components.

Figure 1:
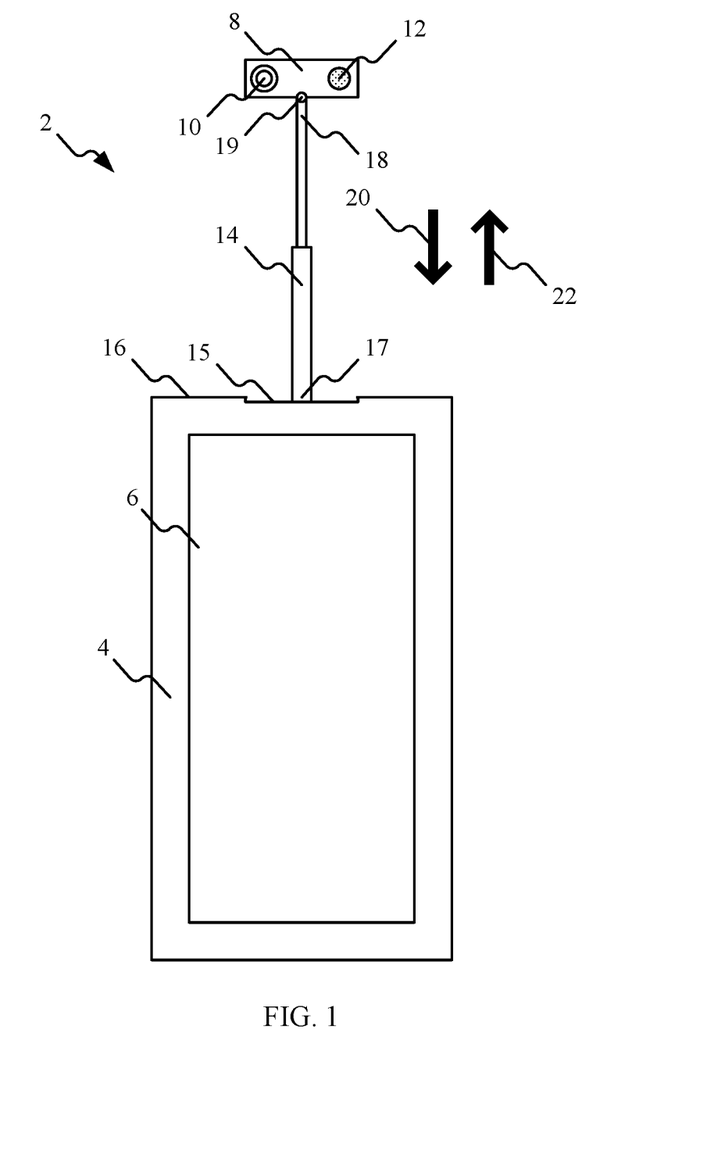
FIG. 1 is a diagram of a portable electronic device with a retractable antenna rod in an extended position, in accordance with some embodiments.

FIG. 1 is a diagram of one exemplary embodiment of a portable electronic device 2. In the embodiment illustrated, the portable electronic device 2 is a mobile phone. In other embodiments, the portable electronic device 2 can include other types of devices (for example, tablets, smart terminals, and the like). The portable electronic device 2 in FIG. 1 includes, among other things, a housing 4, a touch-screen display 6, and a camera 8. The camera 8 includes, among other things, an optical sensor 10 and a light source 12. The camera 8 is coupled to the housing 4 via a retractable antenna rod 14.

The housing 4 includes an opening 15 at a first end 16 of the housing 4. The retractable antenna rod 14 extends away from the opening 15. The retractable antenna rod 14 includes a first end 17 and a second end 18. The retractable antenna rod 14 is coupled at the first end 17 to a portion of the housing 4 located within the opening 15. The camera 8 is coupled to the second end 18 of the housing 4. In some embodiments, as illustrated in FIG. 1, the camera 8 is coupled to the second end 18 of the housing 4 via a ball bearing connector 19.

Figure 2:
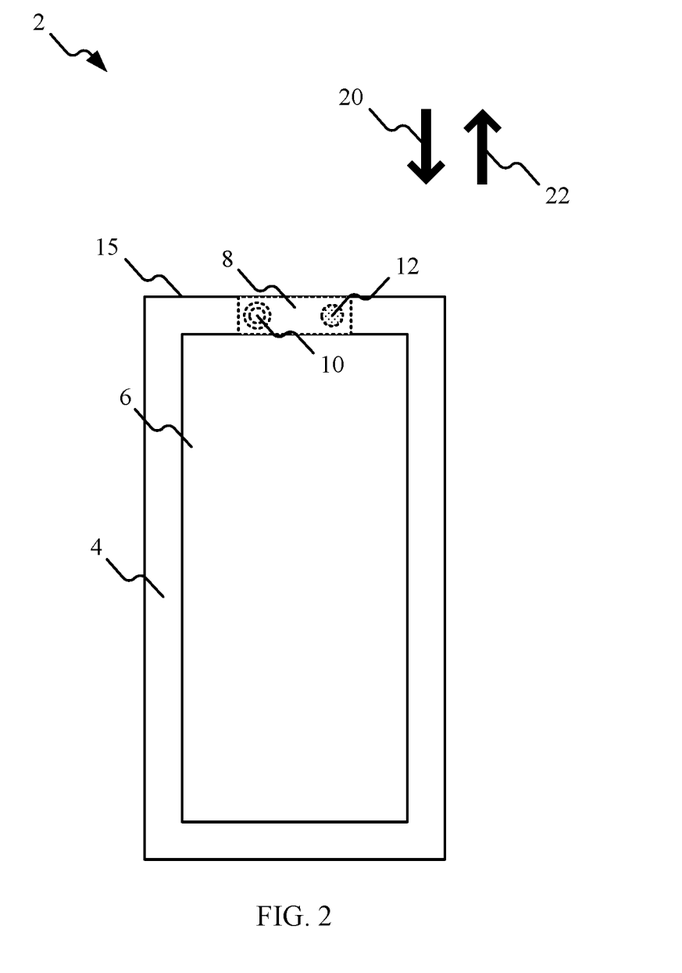
FIG. 2 is a diagram of the portable electronic device in FIG. 1 with the retractable antenna rod in a retracted position.

As explained below in more detail, the retractable antenna rod 14 enables movement of the camera 8 relative to the housing 4 (for example, movement in the direction of arrow 20 and 22). FIG. 1 illustrates the camera 8 positioned in an extended position when the camera 8 is positioned outside of and a distance away from the housing 4 in the direction of arrow 22. FIG. 2 illustrates the camera 8 positioned in a retracted position. In the retracted position, the camera 8 (and the retractable antenna rod 14) is positioned within the housing 4.

Figure 3:
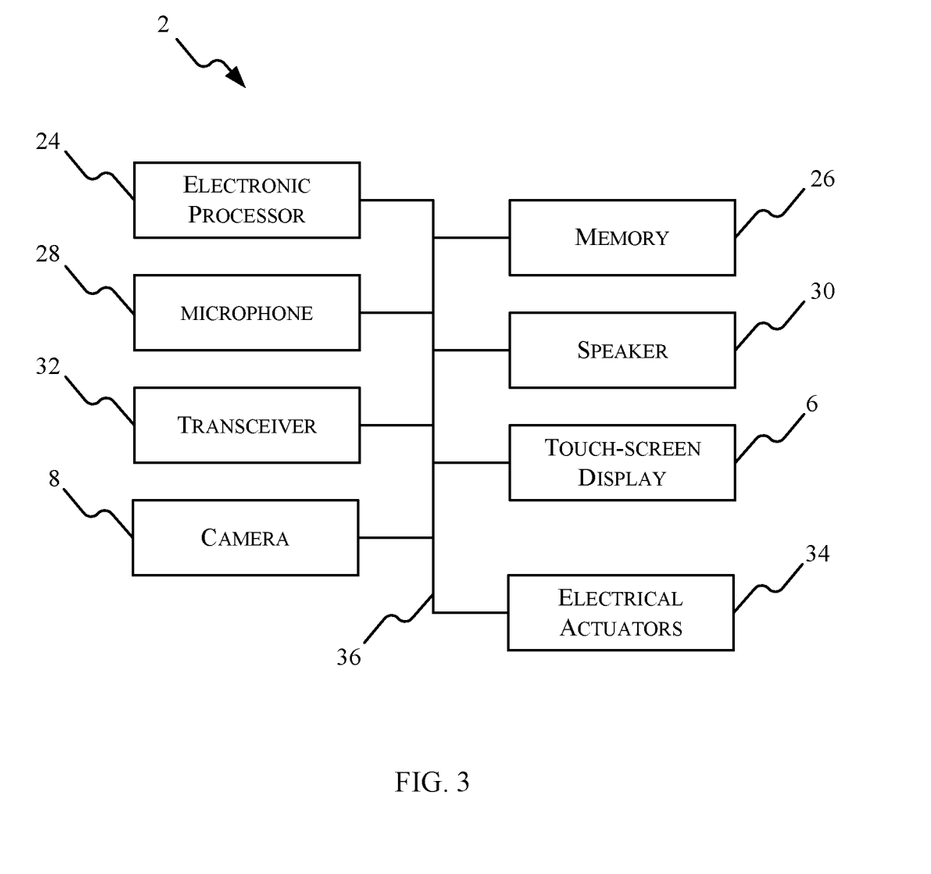
FIG. 3 is a block diagram of the portable electronic device in FIG. 1, in accordance with some embodiments.

FIG. 3 is a diagram of one exemplary embodiment of the portable electronic device 2. In the embodiment illustrated, the portable electronic device 2 includes an electronic processor 24 (for example, a microprocessor, or other electronic controller), a memory 26, a microphone 28, a speaker 30, a transceiver 32, the touch-screen display 6, the camera 8, and electrical actuators 34. The electronic processor 24, the memory 26, as well as the other various modules are coupled by a bus 36, or are coupled directly, by one or more additional control or data buses, or a combination thereof.

The memory 26 may include read only memory (ROM), random access memory (RAM), other non-transitory computer-readable media, or a combination thereof. The electronic processor 24 is configured to retrieve instructions and data from the memory 26 and execute, among other things, instructions to perform the methods described herein. The microphone 28 captures audio data and the speaker 30 outputs audio data.

The transceiver 32 is configured to provide communications between the portable electronic device 2 and one or more additional portable electronic devices within a communication system. The transceiver 32 transmits signals to one or more communication networks and receives signals from the communication networks. In some embodiments, signals include, for example, data, audio data, video data, image data, data packets, or any combination thereof. In some embodiments, the transceiver 32 includes a separate transmitter and receiver. The communication network may be implemented using various networks, for example, a cellular network, the Internet, a Bluetooth™ network, a wireless local area network (for example, Wi-Fi), a wireless accessory Personal Area Networks (PAN), cable, an Ethernet network, satellite, a machine-to-machine (M2M) autonomous network, and a public switched telephone network.

The touch-screen display 6 is a touch-sensitive interface that displays visual output, for example, webpages and other graphical user interfaces (GUIs) generated by software applications executed by the electronic processor 24. The touch-screen display 6 also receives user input using detected physical contact, for example, detected capacitance or resistance. Based on the user input, the touch-screen display 6 outputs signals to the electronic processor 24 which indicate positions on the touch-screen display 6 currently being selected by physical contact. In some embodiments, the touch-screen display 6 includes a liquid crystal display (LCD).

The optical sensor 10 in the camera 8 captures optical signals. For example, the optical sensor 10 may include charged-coupled devices (CCDs) that capture an image, a series of images, video, and the like. The light source 12 includes a light emitting device such as one or more light emitting diodes (LEDs).

The electrical actuators 34 are operably coupled to the camera 8 and to the retractable antenna rod 14 to cause translational, rotational, and pivotal movements of the camera 8 and the retractable antenna rod 14. Translational, rotational, and pivotal movements of the camera 8 and the retractable antenna rod 14 are explained in more details below. The electrical actuators 34 include, for example, electrical motors. In some embodiments, the portable electronic device 2 includes separate electrical actuators 34 to perform each different type of movement of the camera 8 and the retractable antenna rod 14. For example, a first electrical actuator causes translational movement of the camera 8 and the retractable antenna rod 14 relative to the housing 4, a second electrical actuator causes rotational movement of the camera 8 and the retractable antenna rod 14, and a third electrical actuator causes pivotal movement of the camera 8 relative to the retractable antenna rod 14.

Figure 4:
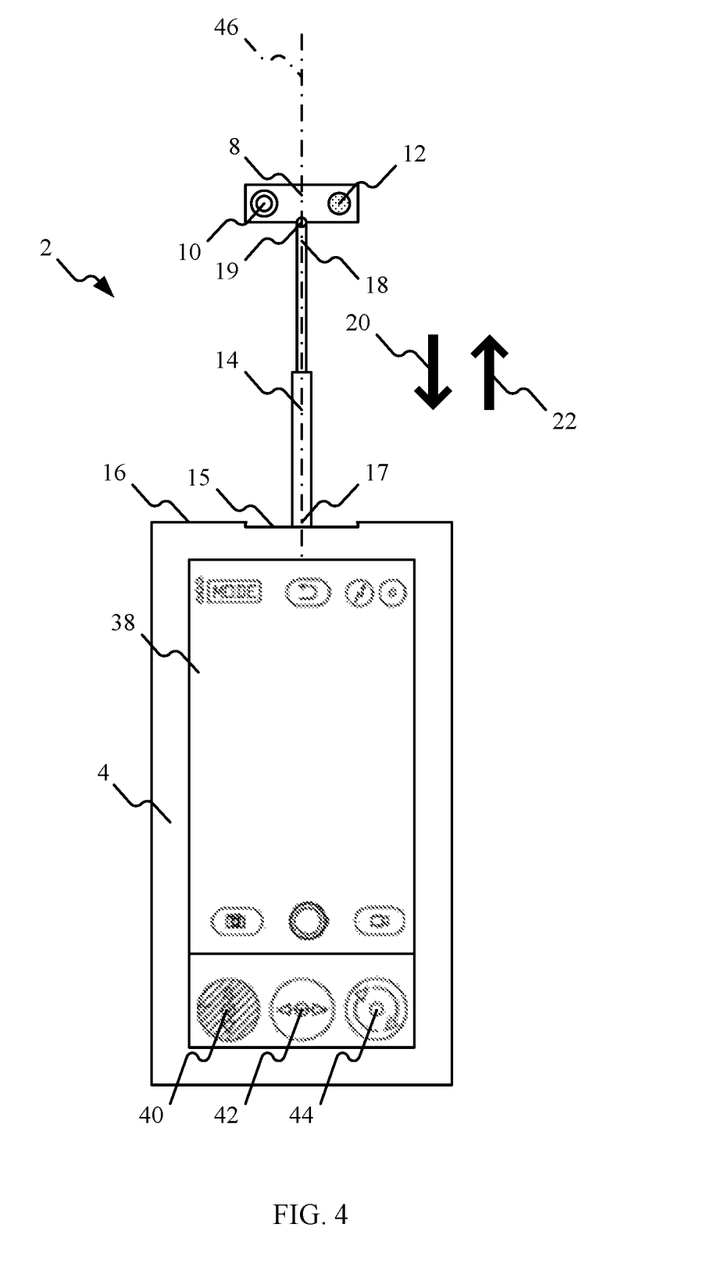
FIGS. 4, 5, and 6 are exemplary screenshots of a touch-screen display included in the portable electronic device in FIG. 1.
Figure 5:
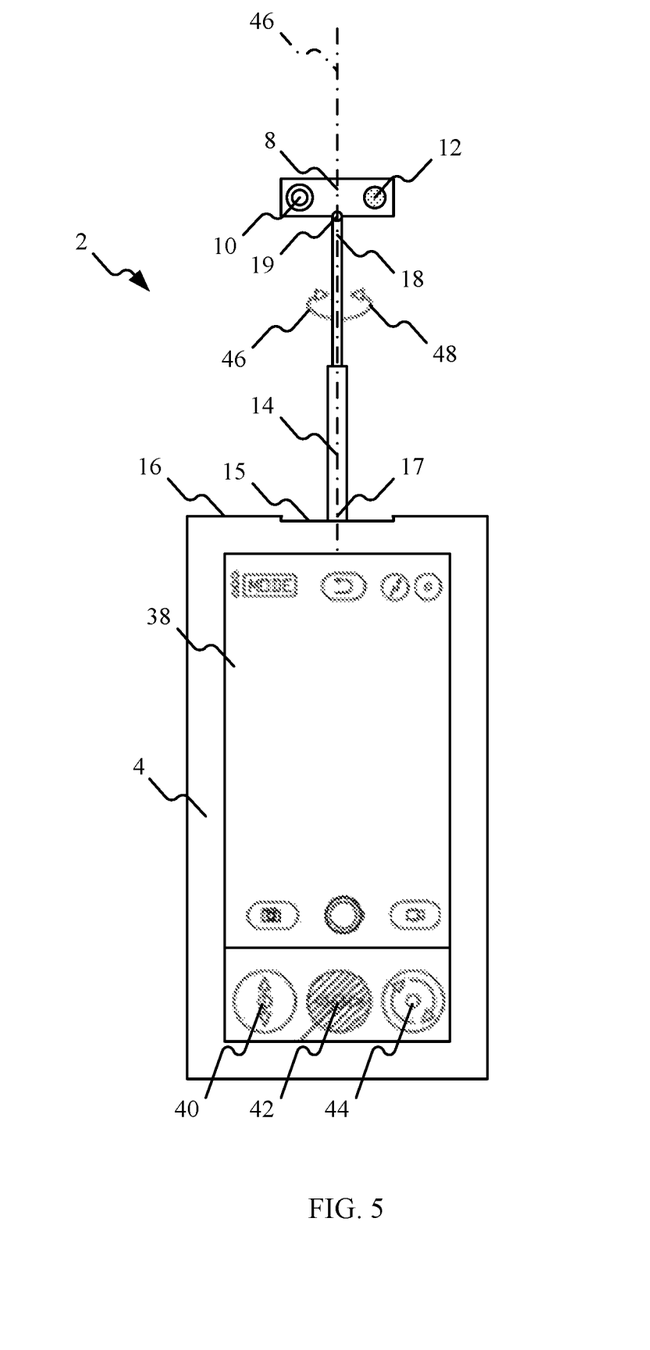
Figure 6:
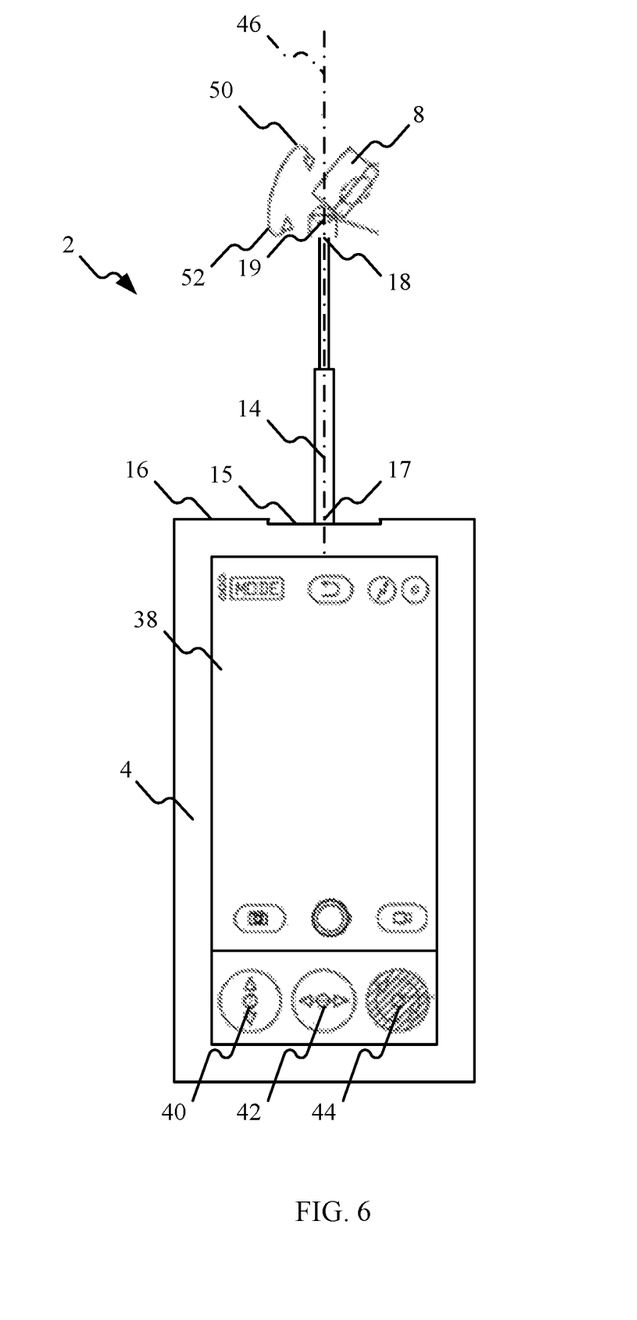

In some embodiments, the electronic processor 24 controls the movement of the camera 8 and the retractable antenna rod 14 via a graphical user interface (GUI) displayed on the touch-screen display 6. FIGS. 4, 5, and 6 illustrate exemplary screenshots displayed by the touch-screen display 6.

In FIG. 4, the touch-screen display 6 displays a camera viewing area 38 of the current images captured by the optical sensor 10 in the camera 8. The touch-screen display 6 in FIG. 4 also displays a vertical position control button 40, a horizontal position control button 42, and a tilt position control button 44. In FIG. 4, the vertical position control button 40 is selected. The vertical position control button 40 regulates vertical movement of the camera 8 (for example, movement in the direction of arrow 20 and 22). In other words, translational movement of the camera 8 along a longitudinal axis 45 of the housing 4. When the vertical position control button 40 is selected, the electronic processor 24 receives a signal from the touch-screen display 6 indicating a request from a user to move the camera 8 in the direction of arrow 20 and 22. In response to receiving the signal, the electronic processor 24 sends a signal to the electrical actuators 34 which causes the retractable antenna rod 14 to either retract toward the housing 4 or extend away from the housing 4.

In FIG. 5, the horizontal position control button 42 is selected. The horizontal position control button 42 regulates horizontal movement of the camera 8 (for example, movement in the direction of arrow 46 and 48). In other words, rotational movement of the camera 8 about the longitudinal axis 45 of the housing 4. When the horizontal position control button 42 is selected, the electronic processor 24 receives a signal from the touch-screen display 6 indicating a request from a user to rotate the camera 8 in the direction of arrow 46 and 48. In response to receiving the signal, the electronic processor 24 sends a signal to the electrical actuators 34 which causes the retractable antenna rod 14 (and the camera 8) to rotate.

In some embodiments, the electronic processor 24 continuously rotates the camera 8 as long as the horizontal position control button 42 remains selected. In other embodiments, the electronic processor 24 rotates the camera 8 by a set amount each time the horizontal position control button 42 is selected. For example, in some embodiments, the electronic processor 24 rotates the camera 8 by 180 degrees each time the horizontal position control button 42 is selected. By having the camera 8 rotate, the portable electronic device 2 can captures images on multiple sides of the housing 4 with a single camera.

In FIG. 6, the tilt position control button 44 is selected. The tilt position control button 44 regulates tilting movements of the camera 8 (for example, movement in the direction of arrow 50 and 52). In other words, pivotal movement of the camera 8 with respect to (or relative to) the longitudinal axis 45 of the housing 4. When the tilt position control button 44 is selected, the electronic processor 24 receives a signal from the touch-screen display 6 indicating a request from a user to pivot the camera 8 in the direction of arrow 50 and 52. In response to receiving the signal, the electronic processor 24 sends a signal to the electrical actuators 34 which causes the camera 8 to pivot relative to the second end 18 of the retractable antenna rod 14.

This disclosure is not limited in its application to the examples provided, the embodiments discussed, or to the details of construction and the arrangement of components set forth in the foregoing description or drawings. The disclosure is capable of other embodiments and of being practiced or of being carried out in various ways.

What is claimed is:
1. A portable electronic device comprising:
a housing defining an interior space and a longitudinal axis, the housing comprising:
a surface,
an opening through the surface, the opening separate from the interior space;
a retractable antenna rod having a first end and a second end that is opposite the first end, wherein the retractable antenna rod is coupled at the first end, and wherein the retractable antenna rod is configured to extend from the interior space in a direction parallel to the longitudinal axis of the housing and into an extended position;
a camera coupled to the second end of the retractable antenna rod, wherein the camera is configured to pass through the surface of the housing, via the opening, and into the interior space when the retractable antenna rod retracts into a retracted positioned within the interior space of the housing;
one or more electrical actuators operably coupled to the retractable antenna rod within the interior space;
a touch-screen display affixed to the housing; and
an electronic processor located in the interior space, the electronic processor electrically coupled to the touch-screen display and to the one or more electrical actuators, the electronic processor configured to:
receive a signal from the touch-screen display, determine a movement direction of the retractable antenna rod based on the signal, and
move the retractable antenna rod in the movement direction via the one or more electrical actuators.

2. The portable electronic device of claim 1, wherein the movement direction comprises at least one of a direction towards the housing or a direction away from the housing, and wherein the electronic processor is further configured to:
display a vertical position control button on the touch-screen display; and
in response to detecting a selection input on the vertical position control button, move the retractable antenna rod, via the one or more electrical actuators, in the movement direction.

3. The portable electronic device of claim 1, wherein the movement direction comprises a rotation of the retractable antenna rod about the longitudinal axis of the housing.

4. The portable electronic device of claim 3, wherein the electronic processor is further configured to:
display a horizontal position control button on the touch-screen display; and
in response to detecting a selection input on the horizontal position control button, move the retractable antenna rod, via the one or more electrical actuators, in the movement direction when the retractable antenna rod is in the extended position.

5. The portable electronic device of claim 1, wherein the movement direction comprises a rotation of the retractable antenna rod 180 degrees about the longitudinal axis of the housing, and wherein the electronic processor is further configured to:
display a horizontal position control button on the touch-screen display, and
in response to detecting a selection input on the horizontal position control button, move the retractable antenna rod, via the one or more electrical actuators, in the movement direction when the retractable antenna rod is in the extended position.

6. The portable electronic device of claim 1, wherein the movement direction comprises a pivot of the camera relative to the second end of the retractable antenna rod.

7. The portable electronic device of claim 6, wherein the electronic processor is further configured to:
display a pivot position control button on the touch-screen display, and
in response to detection a selection input on the pivot position control button, move the camera, via the one or more electrical actuators, in the movement direction when the retractable antenna rod is in the extended position.

8. The portable electronic device of claim 6, wherein the camera is configured to pivot relative to the second end of the retractable antenna rod via a ball bearing connector.

9. A portable electronic device comprising:
a housing defining an interior space and a surface, the housing including an opening through the surface;
a touch-screen display coupled to the housing;
a retractable antenna rod having a first end and a second end that is opposite the first end, wherein the retractable antenna rod is coupled at the first end to a base housed within the interior space, and wherein the retractable antenna rod is configured to move through the opening between a retracted position within the interior space and an extended position opposite the surface of the housing from the interior space;
a connector separate from the retractable antenna rod, the connector coupled to the second end; and
a camera coupled to the connector, wherein:
the camera is positioned within the opening when the retractable antenna rod is in the retracted position and outside of the opening when the retractable antenna rod is in the extended position, and
in the extended position, a first input to the touch-screen display causes rotation of the camera based on rotation of the retractable antenna rod, and a second input to the touch-screen display causes the camera to tilt based on the connector.

10. The portable electronic device of claim 9, wherein the camera is configured to pivot relative to the second end of the retractable antenna rod.

11. The portable electronic device of claim 9, wherein a first side of the camera is coupled to the second end of the retractable antenna rod, wherein a second side of the camera opposite from the first end of the camera is positioned substantially in line with the side of the housing when the retractable antenna rod is in the retracted position.

12. The portable electronic device of claim 9, wherein the interior space that is separate from the opening.

13. The portable electronic device of claim 1, wherein a rotation of the retractable antenna rod causes rotation of the camera.

* * * * *